United States Patent [19]

Terrell et al.

[11] Patent Number: 5,312,708
[45] Date of Patent: May 17, 1994

[54] PHOTOCONDUCTIVE RECORDING MATERIAL HAVING A CROSSLINKED BINDER SYSTEM

[75] Inventors: David Terrell, Lint; Stefaan De Meutter, Antwerpen, both of Belgium

[73] Assignee: AGFA-Gevaret, N.V., Mortsel, Belgium

[21] Appl. No.: 59,284

[22] Filed: May 11, 1993

[30] Foreign Application Priority Data

Jun. 4, 1992 [EP] European Pat. Off. ........ 92201612.6

[51] Int. Cl.$^5$ ............................................. G03G 5/047
[52] U.S. Cl. ......................................... 430/59; 430/58; 430/96
[58] Field of Search .................................... 430/59, 96

[56] References Cited

U.S. PATENT DOCUMENTS

| 4,490,452 | 12/1984 | Champ et al. | 430/59 X |
| 4,513,056 | 4/1985 | Vernois et al. | 428/342 X |
| 5,030,532 | 7/1991 | Limburg et al. | 430/96 X |

FOREIGN PATENT DOCUMENTS

| 2362753 | 7/1974 | Fed. Rep. of Germany | 430/96 |
| 113051 | 9/1980 | Japan | 430/96 |

*Primary Examiner*—Roland Martin
*Attorney, Agent, or Firm*—Breiner & Breiner

[57] ABSTRACT

A photoconductive recording material containing a support and a charge generating layer (CGL) in contiguous relationship (contact) with a charge transporting layer (CTL), containing a n-charge transporting material (n-CTM), wherein the binder of said charge generating layer (CGL) is made insoluble in methylene chloride by crosslinking, and said binder is composed essentially of one or more polymeric reaction products of at least one epoxy resin with at least one polyamide resin having amino groups and being called herein polyaminoamide resin.

9 Claims, No Drawings

PHOTOCONDUCTIVE RECORDING MATERIAL HAVING A CROSSLINKED BINDER SYSTEM

FIELD OF THE INVENTION

The present invention relates to photosensitive recording materials suitable for use in electrophotography.

BACKGROUND OF THE INVENTION

In electrophotography photoconductive materials are used to form a latent electrostatic charge image that is developable with finely divided coloring material, called toner.

The developed image can then be permanently affixed to the photoconductive recording material, e.g. a photoconductive zinc oxide-binder layer, or transferred from the photoconductor layer, e.g. a selenium or selenium alloy layer, onto a receptor material, e.g. plain paper and fixed thereon. In electrophotographic copying and printing systems with toner transfer to a receptor material the photoconductive recording material is reusable. In order to permit rapid multiple printing or copying, a photoconductor layer has to be used that rapidly loses its charge on photo-exposure and also rapidly regains its insulating state after the exposure to receive again a sufficiently high electrostatic charge for a next image formation. The failure of a material to return completely to its relatively insulating state prior to succeeding charging/imaging steps is commonly known in the art as "fatigue".

The fatigue phenomenon has been used as a guide in the selection of commercially useful photoconductive materials, since the fatigue of the photoconductive layer limits the copying rates achievable.

A further important property which determines the suitability of a particular photoconductive material for electrophotographic copying is its photosensitivity, which must be sufficiently high for use in copying apparatuses operating with the fairly low intensity light reflected from the original. Commercial usefulness also requires that the photoconductive layer has a spectral sensitivity that matches the spectral intensity distribution of the light source e.g. a laser or a lamp. This enables, in the case of a white light source, all the colors to be reproduced in balance.

Known photoconductive recording materials exist in different configurations with one or more "active" layers coated on a conducting substrate and include optionally an outermost protective layer. By "active" layer is meant a layer that plays a role in the formation of the electrostatic charge image. Such a layer may be the layer responsible for charge carrier generation, charge carrier transport or both. Such layers may have a homogeneous structure or heterogeneous structure.

Examples of active layers in said photoconductive recording material having a homogeneous structure are layers made of vacuum-deposited photoconductive selenium, doped silicon, selenium alloys and homogeneous photoconducting polymer coatings, e.g. of poly(vinylcarbazole) or polymeric binder(s) molecularly doped with an electron (negative charge carrier) transporting compound or a hole (positive charge carrier) transporting compound such as particular hydrazones, amines and heteroaromatic compounds sensitized by a dissolved dye, so that in said layers both charge carrier generation and charge carrier transport take place.

Examples of active layers in said photoconductive recording material having a heterogeneous structure are layers of one or more photosensitive organic or inorganic charge generating pigment particles dispersed in a polymer binder or polymer binder mixture in the presence optionally of (a) molecularly dispersed charge transport compound(s), so that the recording layer may exhibit only charge carrier generation properties or both charge carrier generation and charge transport properties.

According to an embodiment that may offer photoconductive recording materials with particularly low fatigue a charge generating and charge transporting layer are combined in contiguous relationship. Layers which serve only for the charge transport of charge generated in an adjacent charge generating layer are e.g. plasma-deposited inorganic layers, photoconducting polymer layers, e.g. on the basis of poly(N-vinylcarbazole) or layers made of low molecular weight organic compounds molecularly distributed in a polymer binder or binder mixture.

Useful charge carrier generating pigments (CGM's) belong to one of the following classes:

a) perylimides, e.g. C.I. 71130 (C.I.=Colour Index) described in DBP 2 237 539;

b) polynuclear quinones, e.g. anthanthrones such as C.I. 59 300 described in DBP 2 237 678;

c) quinacridones, e.g. C.I. 46 500 described in DBP 2 237 679;

d) naphthalene 1,4,5,8-tetracarboxylic acid derived pigments including the perinones, e.g. Orange GR, C.I. 71 105 described in DBP 2 239 923;

e) tetrabenzoporphyrins and tetranaphthaloporphyrins, e.g. $H_2$-phthalocyanine in X-crystal form (X-$H_2$Pc) described in U.S. Pat. No. 3,357,989, metal phthalocyanines, e.g. CuPc C.I. 74 160 described in DBP 2 239 924, indium phthalocyanine described in U.S. Pat. No. 4,713,312 and tetrabenzoporphyrins described in EP 428 214A; and naphthalocyanines having siloxy groups bonded to the central metal silicon described in published EP-A 243,205;

f) indigo- and thioindigo dyes, e.g. Pigment Red 88, C.I. 73 312 described in DBP 2 237 680;

g) benzothioxanthene derivatives as described e.g. in Deutsches Auslegungsschrift (DAS) 2 355 075;

h) perylene 3,4,9,10-tetracarboxylic acid derived pigments including condensation products with o-diamines as described e.g. in DAS 2 314 051;

i) polyazo-pigments including bisazo-, trisazo- and tetrakisazo-pigments, e.g. Chlordiane Blue C.I. 21 180 described in DAS 2 635 887, trisazo-pigments, e.g. as described in U.S. Pat. No. 4,990,421 and bisazo-pigments described in Deutsches Offenlegungsschrift (DOS) 2 919 791, DOS 3 026 653 and DOS 3 032 117;

j) squarylium dyes as described e.g. in DAS 2 401 220;

k) polymethine dyes;

l) dyes containing quinazoline groups, e.g. as described in GB-P 1,416,602 according to the following general formula:

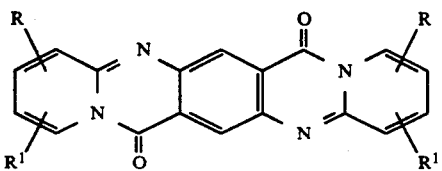

in which R and R¹ are either identical or different and denote hydrogen, $C_1$–$C_4$ alkyl, alkoxy, halogen, nitro or hydroxyl or together denote a fused aromatic ring system;

m) triarylmethane dyes; and
n) dyes containing 1.5-diamino-anthraquinone groups,
o) inorganic photoconducting pigments e.g. Se, Se alloys, $As_2Se_3$, $TiO_2$, ZnO, CdS, etc.

Organic charge carrier transporting substances may be either polymeric or non-polymeric materials.

Preferred non-polymeric materials for negative charge transport are:

a) dicyanomethylene and cyano alkoxycarbonyl-methylene condensates with aromatic ketones such as 9-dicyanomethylene-2,4,7-trinitro-fluorenone (DTF); 1-dicyanomethylene-indan-1-ones as described in published European application 0 537 808 with the formula:

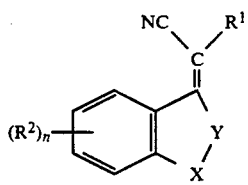

wherein R¹, R², X and Y have the meaning described in said published European application; compounds with the formula:

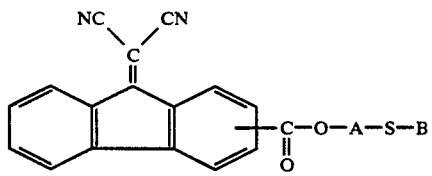

wherein A is a spacer linkage selected from the group consisting of an alkylene group, including a substituted alkylene group, a bivalent aromatic group including a substituted bivalent aromatic group; S is sulfur, and B is selected from the group consisting of an alkyl group, including a substituted alkyl group, an aryl group including a substituted aryl group as disclosed in U.S. Pat. No. 4,546,054, and 4-dicyanomethylene 1,1-dioxo-thiopyran-4-one derivatives as disclosed in U.S. Pat. No. 4,514,481 and U.S. Pat. No. 4,968,813 e.g.

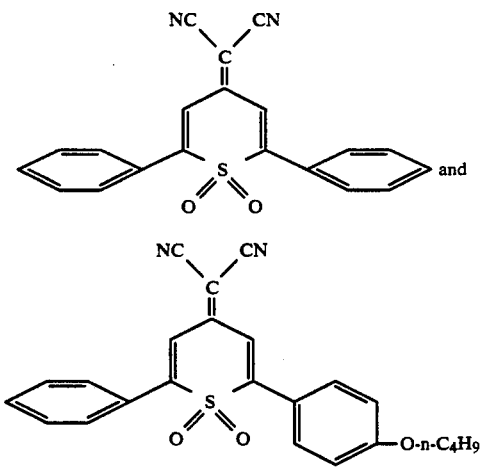

and b) derivatives of malononitrile dimers as described in EP-A 0,534,004;
c) nitrated fluorenones such as 2,4,7-trinitrofluorenone and 2,4,5,7-tetranitrofluorenone;
d) substituted 9-dicyanomethylene fluorene compounds as disclosed in U.S. Pat. No. 4,562,132;
e) 1,1,2-tricyanoethylene derivatives.

The choice of binder for the charge generating layer (CGL) for a given charge generating pigment (CGM) and a given charge transport layer (CTL) has a strong influence on the electro-optical properties of the photoreceptors. One or more of the following phenomena can have a negative influence on the electro-optical properties of the photoconductive recording material:

i) interfacial mixing between the CGL and the CTL resulting in CGM-doping of the CTL and CTM-doping of the CGL causing charge trapping;
ii) charge trapping in the CGL;
iii) poor charge transport in the CGL;
iv) poor charge transport blocking properties in the absence of a blocking layer.

Interfacial mixing between the CGL and the CTL can be avoided by using a CGL-binder or binders, which is/are insoluble in the solvent used for dissolving the CTL-binders in which CTM's exhibit optimum charge transport properties is limited as is the range of solvents in which efficient CTM's are soluble. The range of solvents in which both CTL-binders and CTM's are soluble is extremely narrow and often limited to chlorohydrocarbons such as methylene chloride. Methylene chloride is an extremely powerful solvent and the range of CGL-binders which is totally insoluble in methylene chloride is extremely limited, unless the CGL-binder is crosslinked in a subsequent hardening process.

Hardening is considered here as a treatment which renders the binder of a charge generating layer of the photoconductive recording material insoluble in methylene chloride.

SUMMARY OF THE INVENTION

It is an object of the present invention to provide a multiple layer photoconductive recording material with improved photosensitivity.

It is a further object of the present invention to provide a photoconductive recording material wherein interfacial mixing of a charge transporting layer with a charge generating layer is avoided during overcoating of the charge generating layer with a solution of the charge transporting layer composition.

It is still a further object of the present invention to provide a said photoconductive recording material wherein the binder system for the charge generating layer allows efficient charge transport in the charge generating layer and efficient charge injection into the charge transporting layer which is a negative charge transporting layer.

In accordance with the present invention a photoconductive recording material is provided containing a support and a charge generating layer (CGL) in contiguous relationship (contact) with a charge transporting layer (CTL), containing a n-charge transporting material (n-CTM), wherein the binder of said charge generating layer (CGL) is made insoluble in methylene chloride by crosslinking, and said binder is composed essentially of one or more polymeric reaction products of at least one epoxy resin with at least one polyamide resin having amino groups and being called herein polyaminoamide resin.

DETAILED DESCRIPTION OF THE INVENTION

The amino groups in said polyaminoamide resin can be blocked temporarily to form a stable coating composition wherefrom the amino groups are set free in situ in the coated layer. The blocking of the amino groups may proceed by transforming them into ketimine groups by reaction with a ketone, that is set free again by reaction with moisture (H$_2$O) [ref. "The Chemistry of Organic Film Formers" by D. H. Solomon, John Wiley & Sons, Inc. New York (1967), the chapter "Epoxy Resins", p. 190–191].

According to one embodiment a photoconductive recording material according to the present invention has a charge generating layer containing as the sole binder one or more polyaminoamide resins crosslinked (hardened) with at least one polyepoxy compound which itself may be a resin.

According to another embodiment a photoconductive recording material according to the present invention has a charge generating layer containing one or more polyaminoamide resins crosslinked with at least one polyepoxy compound wherein the equivalent ratio of the total amount of epoxy groups and NH in the polyaminoamide resin is between 2.0:1 and 1:2.5.

According to a further embodiment a photoconductive recording material according to the present invention has a charge generating layer containing at least 30 wt % of charge generating material(s) and as binder one or more polyaminoamide resins hardened with at least one polyepoxy compound.

Examples of epoxy resins for use according to the present invention are within the scope of at least one of the following formulae (I), (II), (III), (IV) and (V):

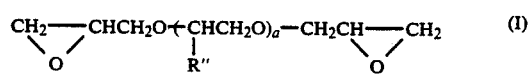

wherein R'' is an alkyl group and a≧0

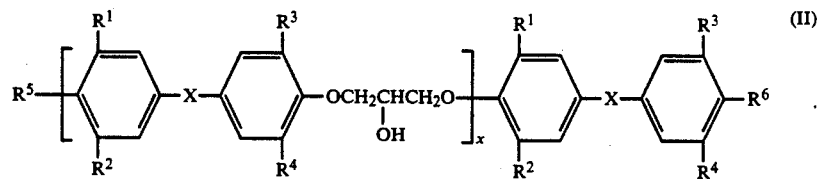

in which: each of R$^5$ and R$^6$ represents

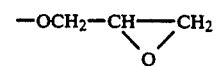

in which: X represents S, SO$_2$,

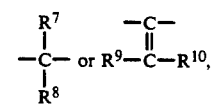

each of R$^1$, R$^2$, R$^3$, R$^4$, R$^7$, R$^8$, R$^9$ and R$^{10}$ (same or different) represents hydrogen, halogen, an alkyl group or an aryl group; or R$^7$ together with R$^8$ and R$^9$ together with R$^{10}$ represent the atoms necessary to close a cycloaliphatic ring, and x is zero or an integer;

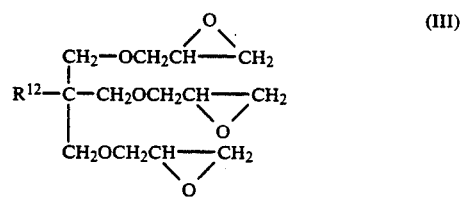

wherein R$^{12}$ is an alkyl group;

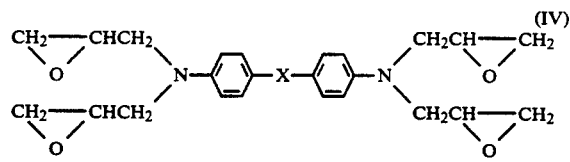

wherein X has the same meaning as above;

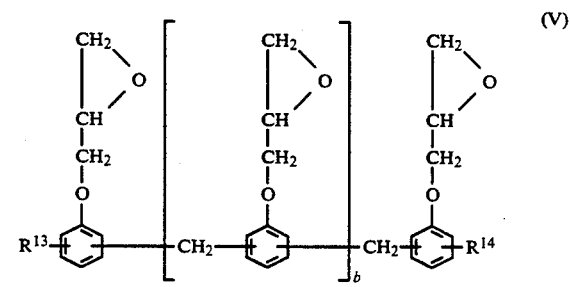

wherein each of R$^{13}$ and R$^{14}$ (same or different) represents hydrogen or an alkyl group and b≧0.

Commercial bisphenol A-epichlorhydrin epoxy resins according to said formula II are mentioned hereinafter by their tradenames:

EPON 828
EPON 1001
EPON 1002
EPON 1004
EPON 1007
EPON 1009 from Shell Chemical Co.;

DER 331
DER 667
DER 668
DER 669 from Dow Chemical—U.S.A.; and

ARALDITE GT 6071
ARALDITE GT 7203
ARALDITE GT 7097
ARALDITE GT 6099 from Ciba-Geigy AG—Switzerland.

A commercially available bisphenol F-epichlorhydrin epoxy resin according to formula II is: ARALDITE GY 281 from Ciba-Geigy.

A commercially available bisphenol A/bisphenol F-epichlorhydrin epoxy resin according to said formula II is: EPON 235 from Shell Chemical Co.

A commercially available epoxy resin according to said formula IV is: ARALDITE MY 721 from Ciba-Geigy AG.

Commercially available phenol novolak epoxy resins according to said formula V are:

DEN 431
DEN 438
DEN 439 from Dow Chemical; and

ARALDITE GY 1180
ARALDITE EPN 1138 from Ciba-Geigy AG.

The preparation of epoxy resins proceeds, for example, by etherification of a polyphenol with epichlorhydrin or dichlorhydrin in the presence of an alkali as described e.g. in U.S. Pat. No. 5,051,209. Many examples of epoxy resins are described in the Handbook of Epoxy Resins, Henry Lee and Kris Neville, 1967, McGraw Hill Book Company.

Examples of polyaminoamide resins for use according to this invention are the reaction products of polymeric fatty acids and polyalkylene polyamines. Illustrative of such polyalkylene polyamines are ethylene diamine, diethylene triamine and triethylene tetramine. These polyaminoamides have a high amine number, preferably in the range of 50 to 400. The polymeric fatty acids can be prepared by thermal polymerization of unsaturated fatty acids, for example, linoleic acid, linolenic, oleic acid, stearic acid and the like as described e.g. in U.S. Pat. No. 5,051,209.

VERSAMID (tradename) resins sold by Cray Valley Products U.K. are, for example, condensation products of dimer acids and a mixture of alkylene polyamines and their structure is exceedingly complex but may be approximated by the following equations:

$$\begin{array}{c}\text{COOH}\\|\\(CH_2)_7\\|\\CH\\\|\\CH\\|\\CH_2\\|\\CH\\\|\\C\\|\\(CH_2)_4\\|\\CH_3\end{array} + \begin{array}{c}\text{COOH}\\|\\(CH_2)_7\\|\\CH\\\|\\C\\|\\CH\\\|\\CH\\|\\(CH_2)_5\\|\\CH_3\end{array} \xrightarrow{\text{Diels-Alder reaction}}$$

(9,12-linoleic acid)   (9,11-linoleic acid) [isomerized]

[structure: cyclohexene ring with substituents COOH-(CH$_2$)$_7$-, (CH$_2$)$_7$COOH, CH$_2$-CH=CH(-CH$_2$)$_4$CH$_3$, (CH$_2$)$_5$CH$_3$]

linoleic acid dimer
+
H$_2$NCH$_2$CH$_2$NH$_2$  $\longrightarrow$
(ethylene diamine)

[structure: cyclohexene ring with substituents including -C(O)-NHCH$_2$CH$_2$NR with (CH$_2$)$_7$, -(CH$_2$)$_7$CNHCH$_2$CH$_2$NHR, -CH$_2$CH=CH-(CH$_2$)$_4$CH$_3$, and (CH$_2$)$_5$CH$_3$]

wherein R may be hydrogen or another linoleic acid dimer group.

Commercially available polyaminoamides for use according to this invention are mentioned hereinafter by their tradenames:

VERSAMID 140
VERSAMID 115 from Cray Valley Products;

UNIREZ 1002
UNIREZ 1307
UNIREZ 5211 from Union Camp Chemicals (UK) Ltd.;

ARALDITE HZ 820
ARALDITE HZ 840 from Ciba-Geigy; and

EPILINK 173
EPILINK 350
EPILINK 353
EPILINK 354 from Akzo, The Netherlands.

The epoxy resins hardened with polyamino-amide resins may be used in combination with at least one other polymer serving as binding agent, e.g. in combination with acrylate and methacrylate resins, copolyesters of a diol, e.g. glycol, with isophthalic and/or terephthalic acid, polyacetals, polyurethanes, polyester-urethanes, aromatic polycarbonates, wherein a preferred combination contains at least 50% by weight of said epoxy resins hardened with polyaminoamide resins in the total binder content.

A polyester resin particularly suited for used in combination with said hardened resins is DYNAPOL L 206 (registered trade mark of Dynamit Nobel for a copolyester of terephthalic acid and isophthalic acid with ethylene glycol and neopentyl glycol, the molar ratio of tere- to isophthalic acid being 3/2). Said polyester resin improves the adherence to aluminum that may form a conductive coating on the support of the recording material.

Aromatic polycarbonates that are suitable for use in admixture with said epoxy resins hardened with polyaminoamide resins can be prepared by methods such as those described by D. Freitag, U. Grigo, P. R. Müller and W. Nouverné in the Encyclopedia of Polymer Science and Engineering, 2nd ed., Vol. II, pages 648-718, (1988) published by Wiley and Sons Inc., and have one or more repeating units within the scope of following general formula:

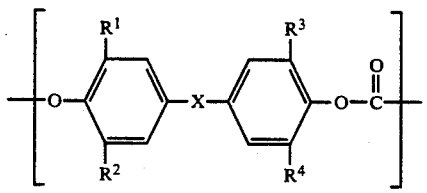

wherein: X, $R^1$, $R^2$, $R^3$ and $R^4$ have the same meaning as described in general formula (II) above.

Aromatic polycarbonates having a molecular weight in the range of 10,000 to 200,000 are preferred. Suitable polycarbonates having such a high molecular weight are sold under the registered trade mark MAKROLON of Bayer AG, W-Germany.

MAKROLON CD 2000 (registered trade mark) is a bisphenol A polycarbonate with molecular weight in the range of 12,000 to 25,000 wherein $R^1=R^2=R^3=R^4=H$, X is

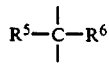

with $R^5=R^6=CH_3$.

MAKROLON 5700 (registered trade mark) is a bisphenol A polycarbonate with molecular weight in the range of 50,000 to 120,000 wherein $R^1=R^2=R^3=R^4=H$, X is

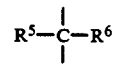

with $R^5=R^6=CH_3$.

Bisphenol Z polycarbonate is an aromatic polycarbonate containing recurring units wherein $R^1=R^2=R^3=R^4=H$, X is

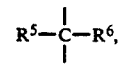

and $R^5$ together with $R^6$ represents the necessary atoms to close a cyclohexane ring.

Suitable electronically inactive binder resins for use in active layers of the present photoconductive recording material containing said polyepoxy compounds hardened with polyaminoamide resins are e.g. the above mentioned polyester and polycarbonates, but also cellulose esters, acrylate and methacrylate resins, e.g. cyanoacrylate resins, polyvinyl chloride, copolymers of vinyl chloride, e.g. copolyvinyl chloride/acetate and copolyvinyl chloride/maleic anhydride.

Further useful binder resins for an active layer are silicone resins, polystyrene and copolymers of styrene and maleic anhydride and copolymers of butadiene and styrene.

Charge transport layers in the photoconductors of the present invention preferably have a thickness in the range of 5 to 50 μm, more preferably in range of 5 to 30 μm. If these layers contain low molecular weight charge transport molecules, such compounds will preferably be present in concentrations of 30 to 70 % by weight.

Preferred binders for the negative charge transporting layers of the recording material according to the present invention are homo- or copolycarbonates, examples of which are enumerated hereinafter with their recurring units and identified as B1 to B7:

B1:

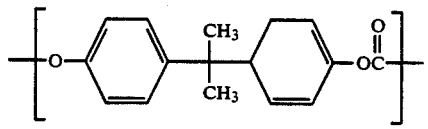

B2:

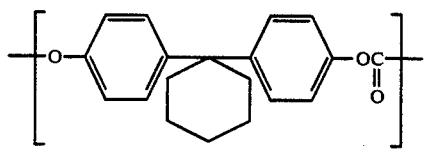

B3:

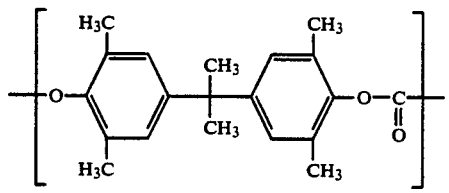

B4:

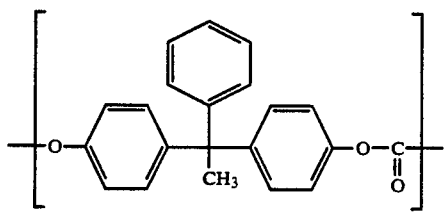

B5:

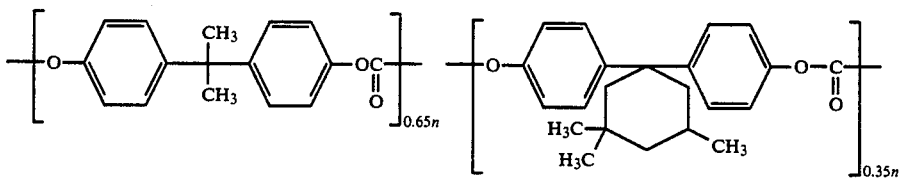

B6:

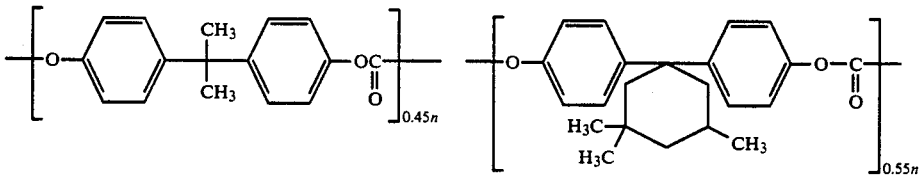

B7:

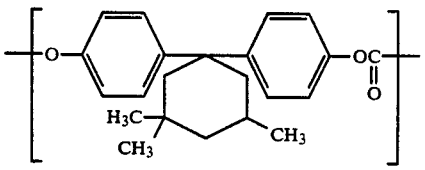

The presence of one or more spectral sensitizing agents can have an advantageous effect on the charge transport. In that connection reference is made to the methine dyes and xanthene dyes described in U.S. Pat. No. 3,832,171. Preferably these dyes are used in an amount not substantially reducing the transparency in the visible light region (420–750 nm) of the charge transporting layer so that the charge generating layer still can receive a substantial amount of the exposure light when exposed through the charge transporting layer.

The charge transporting layer may contain compounds substituted with electron-donor groups forming an intermolecular charge transfer complex, i.e. donor-acceptor complex wherein the hydrazone compound represents an electron donating compound. Useful compounds having electron-donating groups are hydrazones such as 4-N,N-diethylamino-benzaldehyde-1,1-diphenylhydrazone diphenylhydrazone (DEH), amines such as tris(p-tolylamine) (TTA) and N,N'-diphenyl-N,N'-bis(3-methyl-phenyl)-[1,1-biphenyl]-4,4'-diamine (TPD) etc. The optimum concentration range of said derivatives is such that the acceptor/donor weight ratio is 2.5:1 to 1,000:1.

Compounds acting as stabilising agents against deterioration by ultra-violet radiation, so-called UV-stabilizers, may also be incorporated in said charge transport layer. Examples of UV-stabilizers are benztriazoles.

For controlling the viscosity of the coating compositions and controlling their optical clarity silicone oils may be added to the charge transport layer.

The charge transport layer used in the recording material according to the present invention possesses the property of offering a high charge transport capacity coupled with a low dark discharge. While with the common single layer photoconductive systems an increase in photosensitivity is coupled with an increase in the dark current and fatigue such is not the case in the double layer arrangement wherein the functions of charge generation and charge transport are separated and a photosensitive charge generating layer is arranged in contiguous relationship to a charge transporting layer.

As charge generating compounds for use in a recording material according to the present invention any of the organic pigment dyes belonging to one of the following classes and able to transfer electrons to electron transporting materials may be used:
a) perylimides, e.g. C.I. 71 130 (C.I.=Color Index) described in DBP 2,237,539,
b) polynuclear quinones, e.g. anthanthrones such as C.I. 59 300 described in DBP 2,237,678,
c) quinacridones, e.g. C.I. 46 500 described in DBP 2,237,679,
d) naphthalene 1,4,5,8-tetracarboxylic acid derived pigments including the perinones, e.g. Orange GR, C.I. 71 105 described in DBP 2,239,923,
e) tetrabenzoporphyrins and tetranaphthaloporphyrins, e.g. $H_2$-phthalocyanine in X-crystal form (X-$H_2$Pc) described in U.S. Pat. No. 3,357,989, metal-oxyphthalocyanines, metal phthalocyanines, e.g. CuPc C.I. 74 160 described in DBP 2,239,924, indium phthalocyanine described in U.S. Pat. No. 4,713,312, tetrabenzoporphyrins described in EP 428 214A, silicon naphthalocyanines having siloxy groups bonded to the central silicon as described in EP-A 0243 205 and X- and $\beta$-morphology $H_2Pc(CN)_x$, $H_2Pc(CH_3)_x$ and $H_2PcCl_x$ pigments,
f) indigo- and thioindigo dyes, e.g. Pigment Red 88, C.I. 73 312 described in DBP 2,237,680,
g) benzothioxanthene-derivatives as described e.g. in DAS 2 355 075,
h) perylene 3,4,9,10-tetracarboxylic acid derived pigments including condensation products with o-diamines as described e.g. in DAS 2,314,051,
i) polyazo-pigments including bisazo-, trisazo- and tetrakisazo-pigments, e.g. Chlordiane Blue C.I. 21 180 described in DAS 2,635,887, and bisazopigments described in DOS 2,919,791, DOS 3,026,653 and DOS 3,032,117,
j) squarilium dyes as described e.g. in DAS 2,401,220,
k) polymethine dyes.
l) dyes containing quinazoline groups, e.g. as described in GB-P 1,416,602 according to the following general formula:

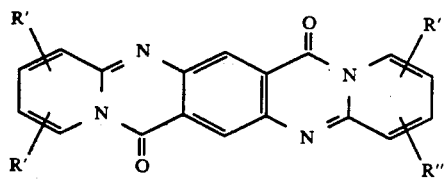

Inorganic substances suited for photogenerating negative charges in a recording material according to the present invention are e.g. amorphous selenium and selenium alloys e.g. selenium-tellurium, selenium-tellurium-arsenic and selenium-arsenic and inorganic photoconductive crystalline compounds such as cadmium sulphoselenide, cadmiumselenide, cadmium sulphide and mixtures thereof as disclosed in U.S. Pat. No. 4,140,529.

The thickness of the charge generating layer is preferably not more than 10 μm, more preferably not more than 5 μm.

In the recording materials of the present invention an adhesive layer or barrier layer may be present between the charge generating layer and the support or the charge transport layer and the support. Useful for that purpose are e.g. a polyamide layer, nitrocellulose layer, hydrolysed silane layer, or aluminum oxide layer acting as blocking layer preventing positive or negative charge injection from the support side. The thickness of said barrier layer is preferably not more than 1 micron.

The conductive support may be made of any suitable conductive material. Typical conductors include aluminum, steel, brass and paper and resin materials incorporating or coated with conductivity enhancing substances. An insulating support such as a resin support, is e.g. provided with a conductive coating, e.g. vacuum-deposited metal such as aluminum, dispersed carbon black, graphite and conductive monomeric salts or a conductive polymer, e.g. a polymer containing quaternized nitrogen atoms as in Calgon Conductive polymer 261 (trade mark of Calgon Corporation. Inc., Pittsburgh, Pa., U.S.A.) described in U.S. Pat. No. 3,832,171.

The support may be in the form of a foil, web or be part of a drum.

An electrophotographic recording process according to the present invention comprises the steps of:
(1) overall electrostatically charging, e.g. with corona-device, the photoconductive layer containing at least one epoxy-hardened polyaminoamide resin;
(2) image-wise photo-exposing said layer thereby obtaining a latent electrostatic image, that may be toner-developed.

When applying a bilayer-system electrophotographic recording material including on an electrically conductive support, a photosensitive charge generating layer that contains one or more polyaminoamide resins hardened with at least one polyepoxy compound in contiguous relationship with a charge transporting layer, the photo-exposure of the charge generating layer proceeds preferably through the charge transporting layer but may be direct if the charge generating layer is uppermost or may proceed likewise through the conductive support if the latter is transparent enough to the exposure light.

The development of the latent electrostatic image commonly occurs preferably with finely divided electrostatically attractable material, called toner particles that are attracted by coulomb force to the electrostatic charge pattern. The toner development is a dry or liquid toner development known to those skilled in the art.

In positive-positive development toner particles deposit on those areas of the charge carrying surface which are in positive-positive relation to the original image. In reversal development, toner particles migrate and deposit on the recording surface areas which are in negative-positive image value relation to the original. In the latter case the areas discharged by photo-exposure obtain by induction through a properly biased developing electrode a charge of opposite charge sign with respect to the charge sign of the toner particles so that the toner becomes deposited in the photo-exposed areas that were discharged in the imagewise exposure (ref.: R. M. Schaffert "Electrophotography"—The Focal Press London—New York, enlarged and revised edition 1975, p. 50–51 and T. P. Maclean "Electronic Imaging" Academic Press—London, 1979, p. 231).

According to a particular embodiment electrostatic charging, e.g. by corona, and the imagewise photo-exposure proceed simultaneously.

Residual charge after toner development may be dissipated before starting a next copying cycle by overall exposure and/or alternating current corona treatment.

Recording materials according to the present invention depending on the spectral sensitivity of the charge generating layer may be used in combination with all kinds of photon-radiation, e.g. light of the visible spectrum, infra-red light, near ultra-violet light and likewise X-rays when electron-positive hole pairs can be formed by said radiation in the charge generating layer. Thus, they can be used in combination with incandescent lamps, fluorescent lamps, laser light sources or light emitting diodes by proper choice of the spectral sensitivity of the charge generating substance or mixtures thereof.

The toner image obtained may be fixed onto the recording material or may be transferred to a receptor material to form thereon after fixing the final visible image.

A recording material according to the present invention showing a particularly low fatigue effect can be used in recording apparatus operating with rapidly following copying cycles including the sequential steps of overall charging, imagewise exposing, toner development and toner transfer to a receptor element.

The following examples further illustrate the present invention without however limiting it thereto.

The evaluations of electrophotographic properties determined on the recording materials of the following examples relate to the performance of the recording materials in an electrophotographic process with a reusable photoreceptor. The measurements of the performance characteristics were carried out by using a sensitometric measurement in which the discharge was obtained for 16 different exposures including zero exposure. The photoconductive recording sheet material was mounted with its conductive backing on an aluminum drum which was earthed and rotated at a circumferential speed of 10 cm/s. The recording material was sequentially charged with a positive corona at a voltage of +5.7 kV operating with a grid voltage of +600V. Subsequently the recording material was exposed (simulating image-wise exposure) with a light dose of monochromatic light obtained from a monochromator positioned at the circumference of the drum at an angle of 45° with respect to the corona source. The photo-exposure lasted 200 ms. Thereupon, the exposed recording material passed an electrometer probe positioned at an angle of 180° with respect to the corona source. After effecting an overall post-exposure with a halogen lamp producing 355 mJ/m2 positioned at an angle of 270° with respect to the corona source a new copying cycle started. Each measurement relates to 80 copying cycles in which the photoconductor is exposed to the full light source intensity for the first 5 cycles, then sequentially to the light source the light output of which is moderated by grey filters of optical densities 0.2, 0.38. 0.55, 0.73, 0.92, 1.02, 1.20, 1.45, 1.56, 1.70, 1.95, 2.16, 2.25, 2.51 and 3.21 each for 5 cycles and finally to zero light intensity for the last 5 cycles.

The electro-optical results quoted in the EXAMPLES 1 to 60 and COMPARATIVE EXAMPLES 1 and 2 hereinafter refer to charging level at zero light intensity (CL) and to discharge at a light intensity corresponding to the light source intensity moderated by a grey filter to the exposure indicated to a residual potential RP.

The % discharge is:

$$\frac{(CL - RP)}{CL} \times 100$$

For a given corona voltage, corona grid voltage, separating distance of the corona wires to recording surface and drum circumferential speed the charging level CL is only dependent upon the thickness of the charge transport layer and its specific resistivity. In practice CL expressed in volts should be preferably $\geq 30$ d, where d is the thickness in $\mu m$ of the charge transport layer.

Charge generating materials (CGM's) used in the following examples have the following formulae:

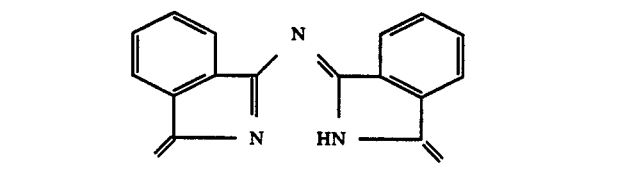

X—H$_2$PC   N in X-morphology

X-H$_2$PC(CN)$_{0.36}$:a mixed crystalline pigment in 1.75:1 molar ratio of H$_2$Pc and

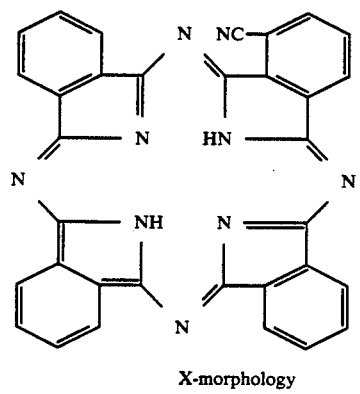

X-morphology

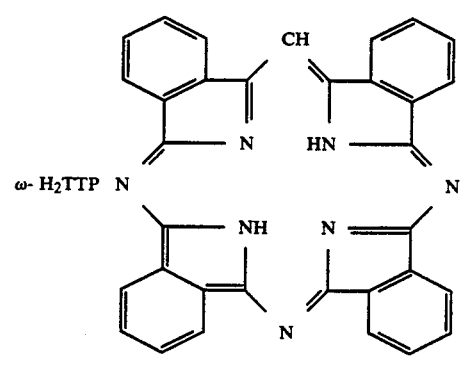

ω- H$_2$TTP in ω-morphology

-continued
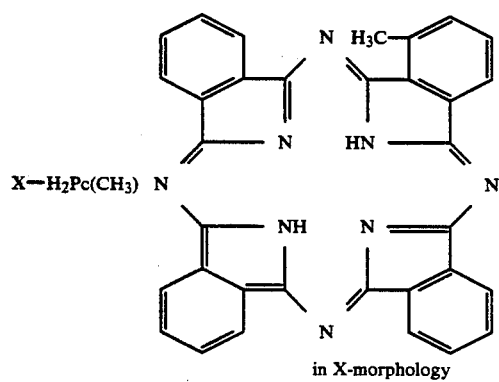
X-H₂Pc(Cl)₀.₆₇: a mixed crystalline pigment of 0.5:1 molar ratio of H₂Pc and
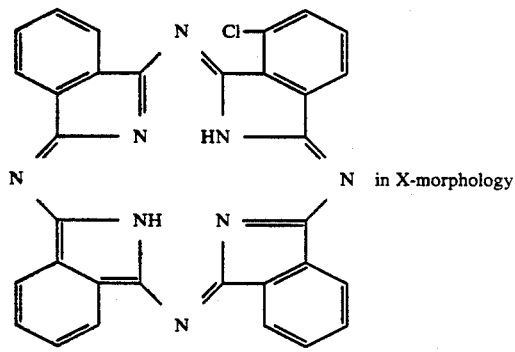
DBA:
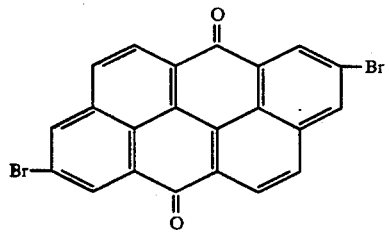
Perylene pigment:
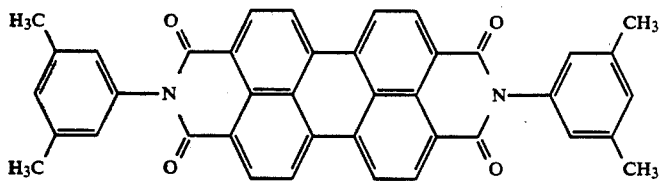
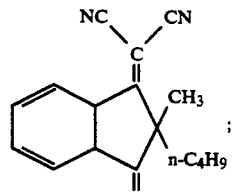  (N1)
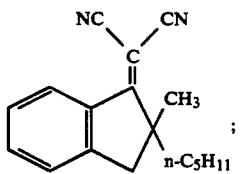  (N2)
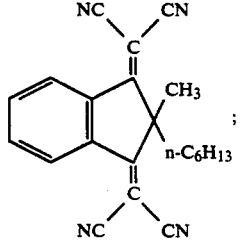  (N3)
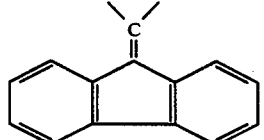  (N4)
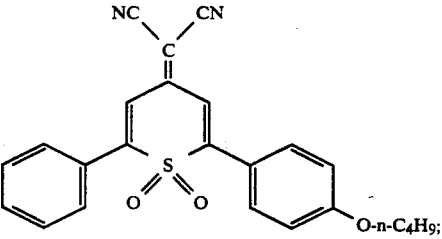  (N5)
Negative charge i.e. electron transporting compounds (N1 to N8) being used in the Examples have the following formulae:

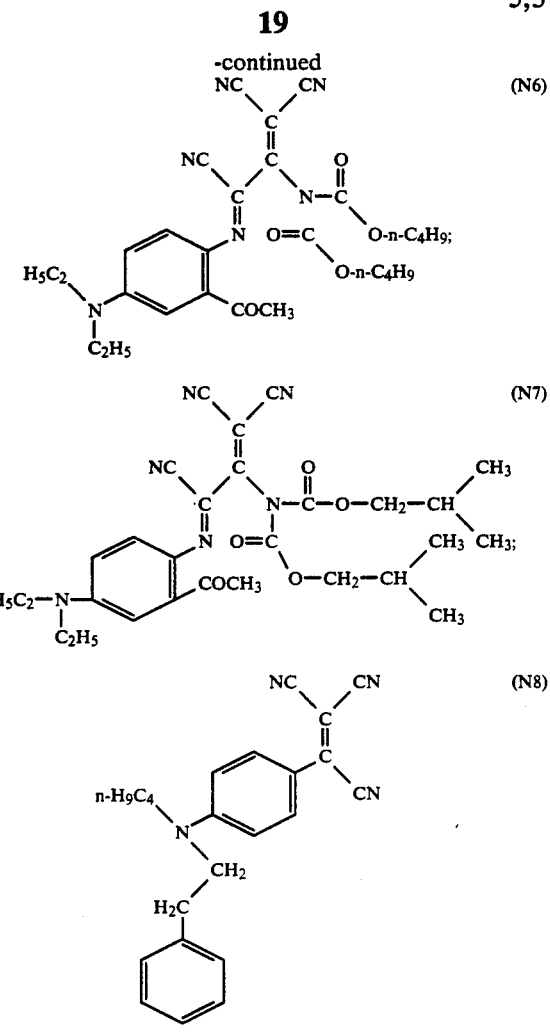

7203 (tradename), 6.154 g of butan-2-one, 7.836 g of methylene chloride and 0.386 g of VERSAMID 140 (tradename), a polyaminoamide resin from Cray Valley Products Ltd, as hardener were then added to the dispersion and the dispersion mixed for a further 15 minutes.

The applied layer was dried and thermally hardened for 2 hours at 100° C. and then overcoated using a doctor blade coater with a filtered solution of 2 g of the CTM N1; 2.44 g of MAKROLON 5700 (tradename), a bisphenol A-polycarbonate from Bayer A.G.; and 35.92 g of methylene chloride to a thickness of 12.1 μm after drying at 50° C. for 16 hours.

The electro-optical characteristics of the thus obtained photoconductive recording material were determined as described above. At a charging level (CL) of +518V and an exposure $I_{660t}$ of 20 mJ/m$^2$, the following results were obtained:

CL = +518V
RP = +91V
% discharge: 82.4

EXAMPLES 2 TO 5

The photoconductive recording materials of examples 2 to 5 were produced as described for example 1 except that the amounts of ARALDITE GT7203 (tradename) and VERSAMID 140 (tradename) were adjusted to obtain various theoretical degress of hardening, as indicated in Table 1, and the CTM used was N2 instead of N1. The weight percentages of ARALDITE GT 7203 (tradename) and VERSAMID 140 (tradename) calculated on the basis of the solids content of the reactants are also given in Table 1 together with the CTL layer thicknesses, $d_{CTL}$ [μm].

The electro-optical characteristics of the thus obtained photoconductive recording materials were determined as described above and the results are summarized in Table 1.

TABLE 1

| Example No. | ARALDITE GT 7203 conc. [wt %] | VERSAMID 140 conc. [wt %] | Theoretical degree of hardening [%] | $I_{660t} = 20$ mJ/m$^2$ | | | |
|---|---|---|---|---|---|---|---|
| | | | | $d_{CTL}$ [μm] | CL [V] | RP [V] | % discharge |
| 2 | 36.8 | 13.2 | 150 | 14.1 | +550 | +108 | 80.4 |
| 3 | 40.35 | 9.65 | 100 | 11.1 | +547 | +110 | 79.9 |
| 4 | 42.4 | 7.6 | 75 | 12.1 | +541 | +108 | 80.0 |
| 5 | 44.65 | 5.35 | 50 | 13.1 | +532 | +128 | 75.9 |

All ratios and percentages mentioned in the Examples are by weight.

EXAMPLE 1

In the production of a composite layer electrophotographic recording material a 175 μm thick polyester film precoated with a vacuum-deposited layer of aluminum was doctor-blade coated with a dispersion of charge generating pigment to a thickness of 0.9 μm with a doctor-blade coater.

Said dispersion was prepared by mixing 2 g of metal-free X-phthalocyanine (FASTOGEN Blue 8120B tradename from Dainippon Ink and Chemicals Inc.); 0.3 g of ARALDITE GT 7203 (tradename for a bisphenol A-epichlorhydrin epoxy resin from Ciba Geigy AG), 16.83 g of methylene chloride and 9.62 g of butan-2-one for 40 hours in a ball mill. 1.314 g of ARALDITE GT

EXAMPLES 6 and 7

The photoconductive recording materials of examples 6 and 7 were produced as described for example 1 except that alternative polyaminoamide hardeners were used. The amounts of ARALDITE GT 7203 (tradename) and polyaminoamide hardeners were adjusted to obtain a theoretical degree of hardening of 100%. The weight percentages of ARALDITE GT 7203 (tradename) and hardener in the CGL's calculated on the basis of the solids content of the hardener are given in Table 2 together with the CTL layer thicknesses.

The electro-optical characteristics of the thus obtained photoconductive recording materials were determined as described above and the results are summarized with those for the photoconductive recording material of example 1 in Table 2.

TABLE 2

| Example No. | ARALDITE GT 7203 conc. [wt %] | Polyaminoamide hardener (tradenames) | Hardener conc. [wt %] | $I_{660}t = 20$ mJ/m$^2$ | | | % discharge |
|---|---|---|---|---|---|---|---|
| | | | | $d_{CTL}$ [μm] | CL [V] | RP [V] | |
| 1 | 40.35 | VERSAMID 140* | 9.65 | 12.1 | +518 | +91 | 82.4 |
| 6 | 35.25 | VERSAMID 115* | 14.75 | 13.1 | +538 | +108 | 79.9 |
| 7 | 34.98 | ARALDITE HZ820+ | 15.02 | 12.1 | +537 | +103 | 80.8 |

*from Cray Valley Products Ltd.
+from Ciba-Geigy

EXAMPLES 8 TO 16

The photoconductive recording materials of examples 8 to 16 were produced as described for example 1 except that alternative polyaminoamide hardeners were used and N2 or N3 was used as the CTM instead of N1 as indicated in Table 3. The amounts of ARALDITE GT 7203 (tradename) and polyaminoamide hardeners were adjusted to obtain a theoretical degree of hardening of 100%. The weight percentages of ARALDITE GT 7203 (tradename) and hardener in the CGL's calculated on the basis of the solids content of the hardener are given in Table 3 together with the CTL layer thicknesses.

The electro-optical characteristics of the thus obtained photoconductive recording materials were determined as described above and the results are summarized in Table 3.

in the case of example 16 N3 was used as the CTM instead of N1. The amounts of epoxy resin and VERSAMID 140 (tradename) were adjusted to obtain a theoretical degree of hardening of 100%. The weight percentages of epoxy resin and VERSAMID 140 (tradename) calculated on the basis of the solids content of Versamid 140 are given in Table 4 together with the CTL layer thicknesses.

The electro-optical characteristics of the thus obtained photoconductive recording materials were determined as described above and the results are summarized in Table 4 together with those for the photoconductive recording material of example 1.

TABLE 4

| Example No. | Epoxy resin (tradenames) | Epoxy resin conc. [wt %] | Versamid 140 conc. [wt %] | $I_{660}t = 20$ mJ/m$^2$ | | | % discharge |
|---|---|---|---|---|---|---|---|
| | | | | $d_{CTL}$ [μm] | CL [V] | RP [V] | |
| 17 | EPON 235* | 27.27 | 22.73 | 11.1 | +524 | +116 | 77.9 |
| 18 | EPON 828* | 27.9 | 22.1 | 14.1 | +519 | +116 | 77.6 |
| 19 | DER 331+ | 27.91 | 22.09 | 13.1 | +514 | +123 | 76.1 |
| 20 | ARALDITE GT6071° | 37.73 | 12.27 | 12.1 | +539 | +115 | 78.7 |
| 21 | EPON 1001* | 38 | 12 | 13.1 | +523 | +129 | 75.3 |
| 1 | ARALDITE GT7203° | 40.35 | 9.65 | 12.1 | +518 | +91 | 82.4 |
| 22 | ARALDITE GT7097° | 46.1 | 3.9 | 10.1 | +534 | +97 | 81.8 |
| 23 | EPON 1009* | 47.8 | 2.2 | 12.1 | +543 | +145 | 73.3 |

*from Shell Chemical Co.
+from Dow Chemical
°from Ciba-Geigy AG.

EXAMPLES 24 TO 29

The photoconductive recording materials of examples 24 to 29 were produced as described for example 1 except that different bisphenol A-epichlorhydrin epoxy

TABLE 3

| Example No. | ARALDITE GT 7203 conc. [wt %] | Polyaminoamide hardener (tradenames) | Hardener conc. [wt %] | CTM | $I_{660}t = 20$ mJ/m$^2$ | | | % discharge |
|---|---|---|---|---|---|---|---|---|
| | | | | | $d_{CTL}$ [μm] | CL [V] | RP [V] | |
| 8 | 40.35 | VERSAMID 140 | 9.65 | N3 | 13.1 | +541 | +107 | 80.2 |
| 9 | 35.53 | UNIREZ 1002* | 14.47 | N3 | 14.1 | +564 | +96 | 83.0 |
| 10 | 40.66 | UNIREZ 1307* | 9.34 | N2 | 16.1 | +541 | +98 | 81.9 |
| 11 | 33.38 | UNIREZ 5211* | 16.62 | N3 | 12.1 | +566 | +98 | 82.7 |
| 12 | 42.81 | ARALDITE HY840+ | 7.19 | N3 | 12.1 | +549 | +114 | 79.2 |
| 13 | 34.15 | EPILINK 173° | 15.85 | N3 | 12.1 | +554 | +124 | 77.6 |
| 14 | 40.58 | EPILINK 350° | 9.42 | N3 | 11.1 | +559 | +123 | 78.0 |
| 15 | 27.29 | EPILINK 353° | 22.71 | N3 | 12.1 | +557 | +114 | 79.5 |
| 16 | 22.16 | EPILINK 354° | 27.84 | N3 | 12.1 | +553 | +121 | 78.1 |

*from Union Camp Chemicals (UK) Ltd
+from Ciba Geigy AG, Switzerland
°from Akzo, The Netherlands.

EXAMPLES 17 TO 23

The photoconductive recording materials of examples 17 to 23 were produced as described for examples 1 except that different bisphenol A-epichlorhydrin epoxy resins from different suppliers with different epoxy equivalent weights were used instead of ARALDITE GT7203 tradename) as indicated in Table 4 and resins from different suppliers with different epoxy equivalent weights were used instead of ARALDITE GT7203 (tradename) as indicated in Table 5 and N2 was used as the CTM instead of N1. The amounts of epoxy resin and VERSAMID 140 (tradename) were adjusted to obtain a theoretical degree of hardening of 100%.

The weight percentages of epoxy resin and VERSAMID 140 (tradename) calculated on the basis of the solids content of VERSAMID 140 (tradename) are given in Table 5 together with the CTL layer thicknesses.

The electro-optical characteristics of the thus obtained photoconductive recording materials were determined as described above and the results are summarized in Table 5.

TABLE 5

| Example No. | Epoxy resin (tradenames) | Epoxy resin conc. [wt %] | Versamid 140 conc. [wt %] | $I_{660}t = 20$ mJ/m2 | | | % discharge |
|---|---|---|---|---|---|---|---|
| | | | | $d_{CTL}$ [μm] | CL [V] | RP [V] | |
| 24 | ARALDITE 7203* | 40.35 | 9.65 | 13.1 | +526 | +78 | 85.2 |
| 25 | DER 667+ | 46.11 | 3.89 | 14.1 | +544 | +119 | 78.1 |
| 26 | ARALDITE GT6099* | 47.34 | 2.66 | 12.1 | +556 | +128 | 77.0 |
| 27 | DER 668+ | 47.42 | 2.58 | 12.1 | +553 | +129 | 76.7 |
| 28 | EPON 1009° | 47.8 | 2.2 | 14.1 | +568 | +131 | 76.9 |
| 29 | DER 669+ | 48.39 | 1.61 | 13.1 | +560 | +118 | 78.9 |

*from Ciba-Geigy AG
+from Dow Chemical
°from Shell Chemical Co.

COMPARATIVE EXAMPLE 1 AND 2

The photoconductive recording material of comparative examples 1 and 2 were produced as described for examples 20 and 24 except that no VERSAMID 140 (tradename) was used. The resin concentrations and CTL layer thicknesses are summarized in Table 6.

The electro-optical characteristics of the thus obtained photoconductive recording materials were determined as described above and the results are summarized in Table 6 below.

These results are clearly inferior to those obtained with CGL-binder consisting of the same resins hardened with VERSAMID 140 (tradename), see examples 24 and 28 respectively.

TABLE 6

| Comparative Example No. | Epoxy resin (tradenames) | Epoxy resin conc. [wt %] | $I_{660}t = 20$ mJ/m² | | | % discharge |
|---|---|---|---|---|---|---|
| | | | $d_{CTL}$ [μm] | CL [V] | RP [V] | |
| 1 | ARALDITE GT 7203 | 50 | 12.1 | +528 | +164 | 68.9 |
| 2 | EPON 1009 | 50 | 13.1 | +51 | +159 | 71.1 |

EXAMPLES 30 TO 34

The photoconductive recording materials of examples 30 to 34 were produced as described for example 1 except that different phenol novolak epoxy resins from different suppliers were used instead of ARALDITE GT7203 (tradename) as indicated in Table 7 and different CTM's were used in examples 30, 32, 33 and 34 as indicated in Table 7. The amounts of epoxy resin and VERSAMID 140 (tradename) were adjusted to obtain a theoretical degree of hardening of 100%. The weight percentages of epoxy resin and VERSAMID 140 (tradename) calculated on the basis of the solids content of VERSAMID 140 (tradename) are given in Table 7 together with the CTL layer thicknesses.

The electro-optical characteristics of the thus obtained photoconductive recording materials were determined as described above and the results are summarized in Table 7.

TABLE 7

| Example No. | Eposy resin (tradenames) | Epoxy resin conc. [wt %] | Versamid 140 conc. [wt %] | CTM | $I_{660}t = 20$ mJ/m² | | | % discharge |
|---|---|---|---|---|---|---|---|---|
| | | | | | $d_{CTL}$ [μm] | CL [V] | RP [V] | |
| 30 | DEN 431* | 26.99 | 23.01 | N3 | 12.1 | +525 | +104 | 80.2 |
| 31 | ARALDITE GY1180° | 27.16 | 22.84 | N1 | 14.1 | +497 | +134 | 73.0 |
| 32 | DEN 438* | 27.2 | 22.8 | N3 | 11.1 | +520 | +103 | 80.2 |
| 33 | DEN 439* | 28.63 | 21.37 | N3 | 10.1 | +514 | +101 | 80.4 |
| 34 | ARALDITE EPN1138° | 27.2 | 22.8 | N2 | 15.1 | +513 | +122 | 76.2 |

*from Dow Chemical
°from Ciba-Geigy AG.

EXAMPLES 35 TO 39

The photoconductive recording materials of examples 35 to 39 were produced as described for example 1 except that the phenol novolak epoxy resin DEN 438 (tradename) was used instead of ARALDITE GT 7203 (tradename), different polyaminoamide hardeners were used as indicated in Table 8 and N2 was used as the CTM instead of N1. The amounts of epoxy resin and polyaminoamide hardener were adjusted to obtain a theoretical degree of hardening of 100%. The weight percentages of epoxy resin and polyaminoamide calculated on the basis of the solids content of the hardener are given in Table 8 together with the CTL layer thicknesses.

The electro-optical characteristics of the thus obtained photoconductive recording materials were determined as described above and the results are summarized in Table 8 below.

TABLE 8

| Example No. | DEN 438 conc. [wt %] | Polyaminoamide hardener (tradenames) | Hardener conc. [wt %] | $I_{660}t = 20$ mJ/m2 | | | % discharge |
|---|---|---|---|---|---|---|---|
| | | | | $d_{CTL}$ [μm] | CL [V] | RP [V] | |
| 35 | 27.2 | VERSAMID 140 | 22.8 | 14.1 | +539 | +107 | 80.1 |
| 36 | 20.61 | UNIREZ 1002 | 29.39 | 12.1 | +529 | +123 | 76.7 |
| 37 | 19.96 | ARALDITE HZ820 | 30.04 | 13.1 | +523 | +108 | 79.3 |
| 38 | 31.48 | ARALDITE HY840 | 18.52 | 14.1 | +508 | +106 | 79.1 |
| 39 | 12.77 | EPILINK 353 | 37.23 | 14.1 | +533 | +124 | 76.7 |

EXAMPLES 40 TO 44

The photoconductive recording materials of examples 40 to 44 were produced as described for example 1 except that the bisphenol F epoxy ARALDITE GY281 (tradename) from Ciba Geigy was used instead of ARALDITE GT 7203 (tradename), different polyaminoamide hardeners were used as indicated in Table 9 and N2 was used as the CTM instead of N1. The amounts of epoxy resin and polyaminoamide hardener were adjusted to obtain a theoretical degree of hardening of 100%. The weight percentages of epoxy resin and polyaminoamide calculated on the basis of the solids content of the hardener are given in Table 9 together with the CTL layer thicknesses.

The electro-optical characteristics of the thus obtained photoconductive recording materials were determined as described above and the results are summarized in Table 9 below.

TABLE 9

| Example No. | ARALDITE GY281 conc. [wt %] | Hardener (tradenames) | Hardener conc. [wt %] | $I_{660}t = 20$ mJ/m² | | | % discharge |
|---|---|---|---|---|---|---|---|
| | | | | $d_{CTL}$ [μm] | CL [V] | RP [V] | |
| 40 | 26.22 | VERSAMID 140 | 23.78 | 14.1 | +498 | +102 | 79.5 |
| 41 | 19.66 | UNIREZ 1002 | 30.34 | 12.1 | +527 | +122 | 76.9 |
| 42 | 19.03 | ARALDITE HZ820 | 30.97 | 13.1 | +521 | +125 | 76.0 |
| 43 | 30.55 | ARALDITE HY840 | 19.45 | 12.1 | +504 | +112 | 77.8 |
| 44 | 12.04 | EPILINK 353 | 37.96 | 13.1 | +531 | +134 | 74.8 |

EXAMPLE 45

The photoconductive recording material of example 45 was produced as described for example 1 that ARALDITE MY721, a tetra functional epoxy molecule from Ciba-Geigy AG with the structure:

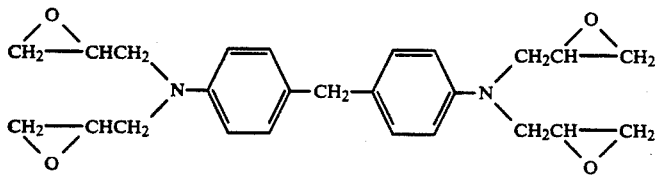

was used instead of ARALDITE GT 7203 and N2 was used as the CTM instead of N1. The CGL contained 22.76 wt % ARALDITE MY 721 and 27.24 wt % VERSAMID 140, corresponding to the amounts needed to obtain a theoretical degree of hardening of 100%. The CTL layer thickness was 13.1 μm.

The electro-optical characteristics of the thus obtained photoconductive recording material were determined as described above. At a charging level (CL) of +476V and an exposure $I_{660}t$ of 20 mJ/m2, the following results were obtained:

CL = +476V
RP = +134V
% discharge = 71.8

EXAMPLES 46 TO 49

The photoconductive recording materials of examples 46 to 49 were produced as described for example 1 except that different CTM's were used instead of N1. TPD as defined hereinbefore was present in the charge transport layer of example 46 in a concentration of 11.1 wt%. The layer thicknesses of the CTL's are given in Table 10.

The electro-optical characteristics of the thus obtained photoconductive recording materials were determined as described above and the results are summarized together with those for the photoconductive recording materials of examples 1, 8 and 24 in Table 10.

TABLE 10

| Example No. | CTM | CTM-conc. [wt %] | $d_{CTL}$ [μm] | λ [nm] | It = 20 mJ/m² | | % discharge |
|---|---|---|---|---|---|---|---|
| | | | | | CL [V] | RP [V] | |
| 1 | N1 | 45 | 12.1 | 660 | +518 | +91 | 82.4 |
| 24 | N2 | 45 | 13.1 | 660 | +526 | +78 | 85.2 |
| 8 | N3 | 45 | 13.1 | 660 | +541 | +107 | 80.2 |
| 46 | N4 | 44.4 | 14.1 | 660 | +414 | +60 | 85.5 |
| 47 | N6 | 50 | 10.1 | 780 | +381 | +125 | 67.2 |
| 48 | N7 | 50 | 14.1 | 780 | +396 | +173 | 56.3 |
| 49 | N8 | 50 | 13.1 | 780 | +483 | +236 | 51.1 |

EXAMPLES 50 TO 55

The photoconductive recording materials of examples 50 to 55 were produced as described for example 1 except that different CGM's were used (as indicated in Table 11) and N2 was used as the CTM instead of N1. The layer thicknesses of the CTL's are given in Table 11.

The electro-optical characteristics of the thus obtained photoconductive recording materials were determined as described above and the results are summarized together with those for the photoconductive recording material of example 24 in Table 11.

TABLE 11

| Example No. | CGM | $d_{CTL}$ [μm] | It = 20 mJ/m2 | | | % discharge |
|---|---|---|---|---|---|---|
| | | | λ [nm] | CL [V] | RP [V] | |
| 24 | FASTOGEN Blue 8120B | 13.1 | 660 | +526 | +78 | 85.2 |
| 50 | X—H2Pc(CN)0.36 | 14.1 | 660 | +459 | +90 | 80.3 |
| 51 | ω-2TTP | 13.1 | 660 | +536 | +190 | 64.1 |
| 52 | X—H2Pc(CH3) | 12.1 | 660 | +561 | +264 | 52.9 |
| 53 | X—H2PcCl0.67 | 13.1 | 660 | +559 | +194 | 65.3 |
| 54 | DBA | 40 12.1 | 540 | +118 | +89 | 24.6 |
| 55 | Perylene pigment | 40 10.1 | 540 | +96 | +79 | 17.7 |

EXAMPLES 56 TO 60

The photoconductive recording layers of examples 56 to 60 were produced as described for example 1 except that different CTLL-binders were used as indicated in Table 12 and N2 was used as the CTM instead f N1. The CTL layer thicknesses are given in Table 12.

The electro-optical characteristics of the thus obtained photoconductive recording materials were determined as described above and the results are summarized with those for the photoconductive recording material of example 24 in Table 12.

TABLE 12

| Example No. | CTL-binder | CTM | $I_{660}t$ = 20 mJ/m2 | | | % discharge |
|---|---|---|---|---|---|---|
| | | | $d_{CTL}$ [μm] | CL [V] | RP [V] | |
| 24 | B1* | N2 | 13.1 | +526 | +78 | 85.2 |
| 56 | B2 | N2 | 14.1 | +564 | +120 | 78.7 |
| 57 | B3 | N2 | 16.1 | +563 | +240 | 57.4 |
| 58 | B4 | N2 | 15.1 | +556 | +108 | 80.6 |
| 59 | B5 | N3 | 12.1 | +497 | +98 | 80.3 |
| 60 | B7 | N3 | 11.1 | +527 | +108 | 79.5 |

*Makrolon 5700

We claim:

1. A photoconductive recording material containing a support and a charge generating layer (CGL) in contiguous relationship (contact) with a charge transporting layer (CTL), containing a n-charge transporting material (n-CTM), wherein the binder of said charge generating layer (CGL) is made insoluble in methylene chloride by crosslinking, and said binder is composed essentially of one or more polymeric reaction products of at least one epoxy resin with at least one polyamide resin having amino groups and being called herein polyaminoamide resin.

2. Photoconductive recording material according to claim 1, wherein said charge generating layer (CTL) contains as the sole binder one or more polyaminoamide resins crosslinked with one or more polyepoxy compounds.

3. Photoconductive recording material according to claim 1, wherein said charge generating layer contains one or more resins obtained by the crosslinking of at least one of said polyaminoamide resins with at least one of said polyepoxy compounds and the equivalent ratio of the total amount of epoxy groups to NH in said polyaminoamide resin(s) is between 2.0:1 and 1:2.5.

4. Photoconductive recording material according to claim 1, wherein said charge generating layer contains at least 30 wt % of charge generating compound(s) and as said binder one or more of said resins obtained by the crosslinking of at least one of said polyaminoamide resins with at least one of said polyepoxy compounds.

5. Photoconductive recording material according to claim 1, wherein said polyepoxy compounds are within the scope of at least one of the following formulae (I), (II), (III), (IV) and (V):

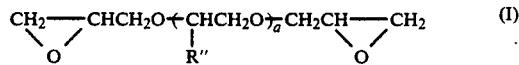

where R" is an alkyl group and a>0

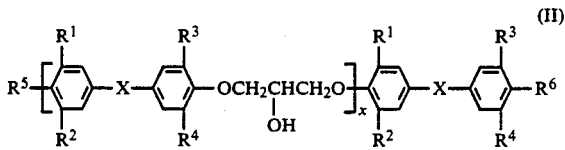

in which: each of $R^5$ and $R^6$ represents

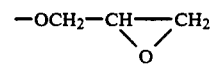

in which: X represents S, SO2,

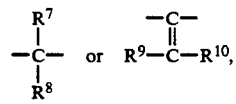

each of $R^1$, $R^2$, $R^3$, $R^4$, $R^7$, $R^8$, $R^9$ and $R^{10}$ (same or different) represents hydrogen, halogen, an alkyl group or an aryl group; or $R^7$ together with $R^8$ and $R^9$ together with $R^{10}$ represent the atoms necessary to close a cycloaliphatic ring, and x is zero or an integer;

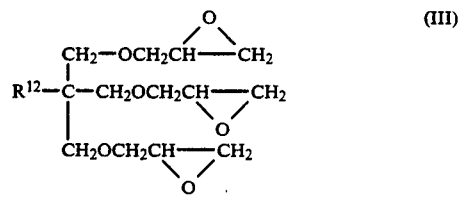

wherein $R^{12}$ is an alkyl group;

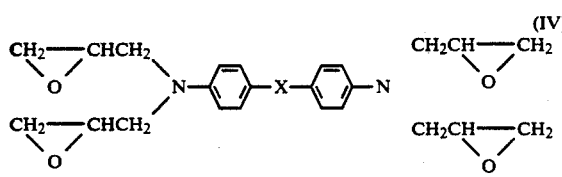

wherein X has the same meaning as above;

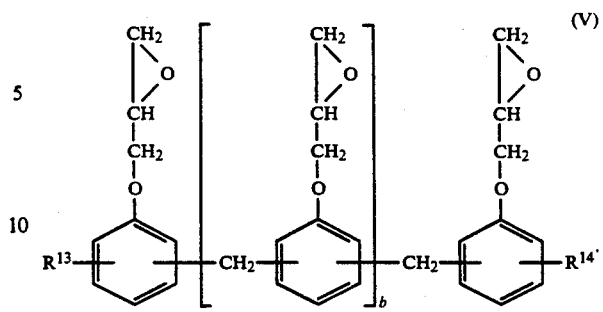

wherein each of $R^{13}$ and $R^{14}$ (same or different) represents hydrogen or an alkyl group and $b \geq 0$.

6. Photoconductive recording material according to claim 1, wherein the amino groups in said polyaminoamide resin have been blocked temporarily and deblocked in situ in said charge generating layer.

7. Photoconductive recording material according to claim 1, wherein said polymeric reaction products obtained by the crosslinking of said polyaminoamide resins with said polyepoxy compounds are present in combination with at least one other polymer serving as binding agent.

8. Photoconductive recording material according to claim 7, wherein said other polymer is selected from the group consisting of an acrylate resin, methacrylate resin, copolyester of a diol with isophthalic and/or terephthalic acid, polyacetal, polyurethane, polyesterurethane and aromatic polycarbonate.

9. Photoconductive recording material according to claim 1, wherein said support consists of aluminum or is an insulating resin support provided with an aluminum layer forming a conductive coating.

* * * * *